United States Patent
Zhang et al.

(10) Patent No.: US 10,624,128 B2
(45) Date of Patent: Apr. 14, 2020

(54) METHODS FOR RANDOM ACCESS IN RADIO NODES AND USER EQUIPMENT

(71) Applicant: Telefonaktiebolaget LM Ericsson (publ), Stockholm (SE)

(72) Inventors: Zhan Zhang, Beijing (CN); Jinhua Liu, Beijing (CN); Virgile Garcia, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/540,061

(22) Filed: Aug. 14, 2019

(65) Prior Publication Data

US 2019/0373638 A1 Dec. 5, 2019

Related U.S. Application Data

(62) Division of application No. 15/104,046, filed as application No. PCT/CN2015/086643 on Aug. 11, 2015, now Pat. No. 10,425,965.

(51) Int. Cl.
*H04W 74/08* (2009.01)
*H04B 17/327* (2015.01)
(Continued)

(52) U.S. Cl.
CPC ...... *H04W 74/0808* (2013.01); *H04B 7/0617* (2013.01); *H04B 17/327* (2015.01);
(Continued)

(58) Field of Classification Search
CPC ... H04W 74/0808; H04W 4/023; H04W 4/02; H04W 16/14; H04W 48/02; H04W 48/04;
(Continued)

(56) References Cited

U.S. PATENT DOCUMENTS 7,804,842 B2 * 9/2010 Malik .................. H04B 7/00
370/241
10,178,696 B2 * 1/2019 Cheng .................. H04W 16/14
(Continued)

FOREIGN PATENT DOCUMENTS

CN 101300871 A 11/2008
CN 101583190 A 11/2009
(Continued)

OTHER PUBLICATIONS

Extended European Search Report for Application No. 15900718.6, dated Feb. 12, 2019, 8 pages.
(Continued)

*Primary Examiner* — Magdi Elhag
(74) *Attorney, Agent, or Firm* — Patent Portfolio Builders, PLLC

(57) ABSTRACT

The present disclosure relates to a method used in a radio node and the associated radio node. The method comprises: obtaining a network geometry of a User Equipment (UE) served by the radio node with respect to a coverage served by the radio node; determining a carrier sensing threshold for the UE based on the network geometry, the carrier sensing threshold for use in Listen-Before-Talk (LBT) measurement over a radio frequency band applicable for transmitting data to the UE; and applying the carrier sensing threshold in the LBT measurement. The present disclosure also relates to a method used in a UE and the associated UE, and to a method used in a radio node and the associated radio node.

18 Claims, 11 Drawing Sheets

(51) Int. Cl.
*H04B 17/336* (2015.01)
*H04B 7/06* (2006.01)
*H04L 5/00* (2006.01)
*H04W 4/02* (2018.01)

(52) U.S. Cl.
CPC ......... *H04B 17/336* (2015.01); *H04L 5/0051* (2013.01); *H04W 4/023* (2013.01)

(58) Field of Classification Search
CPC ..... H04W 48/08; H04W 48/10; H04W 48/12; H04W 48/14; H04B 17/327; H04B 17/336; H04B 7/0617; H04L 5/0051
See application file for complete search history.

(56) References Cited

U.S. PATENT DOCUMENTS

| | | | |
|---|---|---|---|
| 10,218,785 B2* | 2/2019 | Sun | H04W 72/042 |
| 10,425,965 B2* | 9/2019 | Zhang | H04B 7/0617 |
| 2002/0051430 A1* | 5/2002 | Kasami | H04W 16/28 |
| | | | 370/319 |
| 2003/0036404 A1* | 2/2003 | Adachi | H01Q 1/246 |
| | | | 455/522 |
| 2005/0129051 A1 | 6/2005 | Zhu et al. | |
| 2007/0060155 A1 | 3/2007 | Kahana et al. | |
| 2007/0060179 A1 | 3/2007 | Yamauchi et al. | |
| 2007/0242621 A1 | 10/2007 | Nandagopalan et al. | |
| 2010/0067473 A1 | 3/2010 | Cave et al. | |
| 2010/0086068 A1 | 4/2010 | Sahara | |
| 2010/0290355 A1 | 11/2010 | Roy et al. | |
| 2013/0142133 A1 | 6/2013 | Pedersen et al. | |
| 2013/0169481 A1 | 7/2013 | Takatsuka et al. | |
| 2013/0203458 A1 | 8/2013 | Charbit et al. | |
| 2015/0163824 A1 | 6/2015 | Krzymien et al. | |
| 2018/0124622 A1* | 5/2018 | Van Der Velde | H04W 24/10 |
| 2018/0139784 A1* | 5/2018 | Ryoo | H04W 88/08 |
| 2018/0152851 A1* | 5/2018 | Li | H04W 16/14 |
| 2018/0167926 A1* | 6/2018 | Xia | H04B 7/063 |
| 2019/0191460 A1* | 6/2019 | Chendamarai Kannan | |
| | | | H04W 74/0808 |
| 2019/0208549 A1* | 7/2019 | Zhang | H04L 5/0094 |

FOREIGN PATENT DOCUMENTS

| | | |
|---|---|---|
| EP | 3162153 A1 | 5/2017 |
| WO | 2015199593 A1 | 12/2015 |

OTHER PUBLICATIONS

Final Office Action from U.S. Appl. No. 15/104,046, dated Mar. 11, 2019, 18 pages.
Final Office Action from U.S. Appl. No. 15/104,046, dated Apr. 13, 2018, 21 pages.
First Office Action and Search Report from foreign counterpart Taiwan Patent Application No. 105120207, dated Jun. 29, 2017, 10 pages.
International Preliminary Report on Patentability for Application No. PCT/CN2015/086643, dated Apr. 12, 2017, 7 pages.
International Search Report and the Written Opinion for Application No. PCT/CN2015/086643, dated May 11, 2016, 13 pages.
Non-Final Office Action from U.S. Appl. No. 15/104,046, dated Oct. 27, 2017, 28 pages.
Non-Final Office Action from U.S. Appl. No. 15/104,046, dated Sep. 26, 2018, 19 pages.
Notice of Allowance from U.S. Appl. No. 15/104,046, dated May 30, 2019, 13 pages.
Notice of Allowance from foreign counterpart Taiwan Patent Application No. 105120207, dated Nov. 24, 2017, 5 pages.
Requirement for Restriction/Election from U.S. Appl. No. 15/104,046, dated Aug. 18, 2017, 7 pages.

* cited by examiner (a) TX beam and RX beam are matched (b) TX beam and RX beam are not matched

METHODS FOR RANDOM ACCESS IN RADIO NODES AND USER EQUIPMENT

CROSS-REFERENCE TO RELATED APPLICATIONS

This application is a divisional of application Ser. No. 15/104,046, filed Jun. 13, 2016, which is the National stage of International Application No. PCT/CN2015/086643, filed Aug. 11, 2015, which are hereby incorporated by reference.

TECHNICAL FIELD

The present disclosure generally relates to the technical field of wireless communications, and particularly, to a method used in a radio node and the associated radio node, to a method used in a User Equipment (UE) and the associated UE, and to a method used in another radio node and the associated radio node.

BACKGROUND ART

This section is intended to provide a background to the various embodiments of the technology described in this disclosure. The description in this section may include concepts that could be pursued but are not necessarily ones that have been previously conceived or pursued. Therefore, unless otherwise indicated herein, what is described in this section is not prior art to the description and/or claims of this disclosure and is not admitted to be prior art by the mere inclusion in this section.

Owing to the increasing demand to enhance wireless capacity and the lack of availability of spectrum in the lower frequency range (e.g., from 800 MHz to 3 GHz), the use of frequencies in tens of GHz is being investigated. Investigations explore the high frequency bands, for instance, in the frequencies of 6 GHz, 30 GHz, 60 GHz and 98 GHz for the future mobile networks, e.g., the 5th Generation (5G) networks. At such frequencies, a very large bandwidth of radio frequency band is available. This means both operating frequency and bandwidth for the 5G networks are much higher than those used in the legacy mobile network e.g., the 3rd Generation (3G) and the 4th Generation (4G) networks. However, due to the large signal attenuation with respect to path loss, a network operating over such high frequencies is supposed to cover small areas with densely deployed radio access nodes (ANs). Such a deployment may provide sufficient coverage for indoor/hot areas.

FIG. 1 schematically shows one example of the future mobile networks. As shown in FIG. 1, there is a network node or a control node called as Central Control Unit (CCU), which is responsible for parameter configurations and coordination among ANs or Access Points (APs), e.g., AN1, AN2, AN3, and AN4, or any other radio nodes that enable of covering a certain geographical area (similarly corresponds to a cell in the 3G or 4G). Each AN can serve one or more communication devices, such as User Equipments (UE), operating in the wireless communication networks or systems, also known as e.g., wireless terminals, mobile terminals and/or mobile stations and the like terminal devices. For example, AN1 serves UE1, and AN2 serves UE2, etc.

Spectrum sharing is an important characteristic of the future mobile networks. In order to improve the frequency resource utilization, spectrum sharing may be one important method in the future mobile networks compared to the mainly dedicated frequency resource allocation in the current 3G or 4G networks. Via spectrum sharing, each co-existing network can have the opportunity to use the whole shared spectrum when it has traffic and other co-existing network does not have traffic. Thereby, both the spectrum utilization efficiency and user experience can be clearly improved, compared to simply dividing the whole spectrum into multiple segments and assigning one spectrum segment to each individual network as dedicate frequency resource.

Considering the applicability of spectrum sharing in radio access for the future mobile networks and the inherited benefits of the contention-based radio resource allocation (e.g., higher flexibility and relative lower complexity), contention-based Medium Access Control (MAC) seems promising and may probably be used in the future mobile networks in combination with scheduling based method(s).

As one contention-based radio resource allocation scheme, the contention-based MAC works in a distributed way, where radio resource assignments are decided for each link pair separately. As a scheme similarly as IEEE 802.11, in order to avoid collision, a node which needs radio resource shall send a contention message to claim for resource according to predefined rules. The resource reservation is successful if a peer node accepts the reservation. The contention-based MAC works well when low coordination between cells is needed and is a low complexity solution to allow a diversity of link types. It is well known that contention based MACs are suffering high performance losses when heavy loads are in the system if certain coordination or situational parameter adjustment is not available The Listen Before Talk (LTB) operating procedure in IEEE 802.11 is one most well-known contention-based MAC protocol. According to LBT, when there is data traffic for a link, the link's transmitter shall firstly listen to or sense corresponding radio resources (e.g., a radio frequency band corresponding to the link, also called as channel) to determine availability of the channel based on the received power over the channel. If the channel is determined to be available, the transmitter can take the channel by starting the data transmission over the channel directly or by using Request To Send (RTS)—Clear To Send (CTS) mechanism.

In the context of the 5G system, further enhancement of a contention-based method is necessary to boost its performance such as a superior and stable Quality of Service (QoS), spectrum efficiency. The Long-Term Evolution (LTE) network usually owns good network controllability by a good network dimension and well defined network controlling functionality, how to optimize the contention based radio resource allocation in 5G scenarios remains as an open issue.

SUMMARY OF THE INVENTION

The contention-based radio resource allocation usually utilizes the sensing at all transmitter-sides, but usually neither considers the impact of the UE's location (e.g., the UE is located in the center of cell or in the edge of cell) nor considers the impact of high-gain beamforming. This may cause inefficient use of the frequency resource.

It is in view of at least one of the above considerations and others that the various embodiments of the present technology have been made. The present disclosure proposes to optimize the contention-based radio resource allocation based on the geometry of the radio nodes.

According to a first aspect of the present disclosure, there is provided a method used in a radio node. The method includes: obtaining a network geometry of a UE served by the radio node with respect to a coverage served by the radio node; determining a carrier sensing threshold for the UE based on the network geometry, the carrier sensing threshold for use in Listen-Before-Talk (LBT) measurement over a radio frequency band applicable for transmitting data to the UE; and applying the carrier sensing threshold in the LBT measurement.

In an embodiment, applying the threshold in the LBT measurement includes: measuring a radio frequency signal power level on the radio frequency band; and determining that the radio frequency band is available for transmitting data to the UE if the radio frequency signal power level is smaller than or equal to the carrier sensing threshold. In this embodiment, the method further includes: transmitting data to the UE over the radio frequency band.

In an embodiment, the network geometry includes location of the UE in the coverage.

In an embodiment, determining the carrier sensing threshold for the UE based on the network geometry includes: adjusting the carrier sensing threshold to be larger if the UE moves towards the center of the coverage; and/or adjusting the carrier sensing threshold to be smaller if the UE moves towards the edge of the coverage.

In an embodiment, the location of the UE in the coverage is characterized by a pilot signal quality of the radio node.

In an embodiment, the pilot signal quality of the radio node is indicated by one of: a reference signal strength of the radio node; a reference signal Signal to Interference plus Noise Ratio (SINR) of the radio node; or a reference signal strength of the radio node and reference signal strength of one or more neighboring radio nodes of the radio node.

According to a second aspect of the present disclosure, there is provided a method used in a UE served by a radio node. The method includes: obtaining a network geometry of the UE with respect to a coverage served by the radio node; determining a carrier sensing threshold for the UE based on the network geometry, the carrier sensing threshold for use in Listen-Before-Talk (LBT) measurement over a radio frequency band applicable for transmitting data to the radio node; and applying the carrier sensing threshold in the LBT measurement.

According to a third aspect of the present disclosure, there is provided a method used in a radio node. The method includes: obtaining a network geometry of a UE served by the radio node with respect to a coverage served by the radio node; determining a width of a RX beam based on the network geometry, the RX beam for use in Listen-Before-Talk (LBT) measurement over a radio frequency band applicable for transmitting data to the UE; and applying the RX beam with the determined width in the LBT measurement.

According to a fourth aspect of the present disclosure, there is provided a radio node. The radio node includes an obtaining unit configured to obtain a network geometry of a UE served by the radio node with respect to a coverage served by the radio node. The radio node further includes a determining unit configured to determine a carrier sensing threshold for the UE based on the network geometry, the carrier sensing threshold for use in Listen-Before-Talk (LBT) measurement over a radio frequency band applicable for transmitting data to the UE. The radio node further includes an LBT measurement unit configured to apply the carrier sensing threshold in the LBT measurement.

According to a fifth aspect of the present disclosure, there is provided a radio node. The radio node includes a transceiver, a processor and a memory. The memory contains instructions executable by the processor whereby the radio node is operative to: obtain a network geometry of a UE served by the radio node with respect to a coverage served by the radio node; determine a carrier sensing threshold for the UE based on the network geometry, the carrier sensing threshold for use in Listen-Before-Talk (LBT) measurement over a radio frequency band applicable for transmitting data to the UE; and apply the carrier sensing threshold in the LBT measurement.

According to a sixth aspect of the present disclosure, there is provided a UE served by a radio node. The UE includes an obtaining unit configured to obtain a network geometry of the UE with respect to a coverage served by the radio node. The UE further includes a determining unit configured to determine a carrier sensing threshold for the UE based on the network geometry, the carrier sensing threshold for use in Listen-Before-Talk (LBT) measurement over a radio frequency band applicable for transmitting data to the radio node. The UE further includes a LBT measurement unit configured to apply the carrier sensing threshold in the LBT measurement.

According to a seventh aspect of the present disclosure, there is provided a UE served by a radio node. The UE includes a transceiver, a processor and a memory. The memory contains instructions executable by the processor whereby the UE is operative to: obtain a network geometry of the UE with respect to a coverage served by the radio node; determine a carrier sensing threshold for the UE based on the network geometry, the carrier sensing threshold for use in Listen-Before-Talk (LBT) measurement over a radio frequency band applicable for transmitting data to the radio node; and apply the carrier sensing threshold in the LBT measurement.

According to an eighth aspect of the present disclosure, there is provide a radio node. The radio node includes an obtaining unit configured to obtain a network geometry of a UE served by the radio node with respect to a coverage served by the radio node. The radio node further includes a determining unit configured to determine a width of a RX beam based on the network geometry. The RX beam is used in Listen-Before-Talk (LBT) measurement over a radio frequency band applicable for transmitting data to the UE. The radio node further includes a LBT measurement unit configured to apply the RX beam with the determined width in the LBT measurement.

According to a ninth aspect of the present disclosure, there is provided a radio node. The radio node includes a transceiver, a processor and a memory. The memory contains instructions executable by the processor whereby the radio node is operative to: obtain a network geometry of a UE served by the radio node with respect to a coverage served by the radio node; determine a width of a RX beam based on the network geometry, the RX beam for use in Listen-Before-Talk (LBT) measurement over a radio frequency band applicable for transmitting data to the UE; and apply the RX beam with the determined width in the LBT measurement.

According to a tenth aspect of the present disclosure, there is provided a computer program product storing instructions that when executed, causing one or more computing devices to perform the method according to any one of the first to the third aspects.

The above embodiments of the first aspect are also applicable for the remaining aspects.

According to the 1st, 2nd, 4th-7th, and 10th embodiments of the present disclosure, the network geometry is considered in setting a threshold for use in determining whether a radio frequency band is applicable for transmitting data from a radio node to a UE served by the radio node or from the UE to the radio node. For example, for a UE located in the center of its serving radio node, the higher threshold may be set, compared to a UE located in the edge of the radio node. This can improve channel reusing in the contention-based resource allocation.

According to the 3rd, 8th, 9th and 10th embodiments of the present disclosure, the network geometry is considered in setting a RX beam for use in a radio node listening to a radio frequency band is applicable for transmitting data to a UE served by the radio node. For example, for a UE located in the center of its serving radio node, the corresponding RX beam to be applied by the radio node is larger, compared to a UE located in the edge of the radio node. This can relieve the deafness problem caused by the high gain beamforming, which may be popular in the further mobile networks

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

According to Listen-before-talk (LBT), if a radio node is intended to perform a transmission over a radio frequency band, it is required to sense the radio frequency band for a period of time to determine availability of the radio frequency band. To be specific, a non-zero threshold (also called as a carrier sensing threshold) may be used here to judge the availability of the radio frequency band. The radio node may compare a radio frequency signal power level listened over the radio frequency and with the carrier sensing threshold. If the radio frequency signal power level is not larger than the carrier sensing threshold, the radio node will determine that the radio frequency band is available and then commence to perform the transmission. Usually, the operations before the transmission may be called as LBT measurement.

It should be noted that the radio frequency band here refers to a channel and may be also construed as involving one or more continues or discontinues radio sub-bands or sub-carriers.

The present disclosure firstly proposes to adaptively adjust the carrier sensing threshold based on a network geometry.

Figure 1:
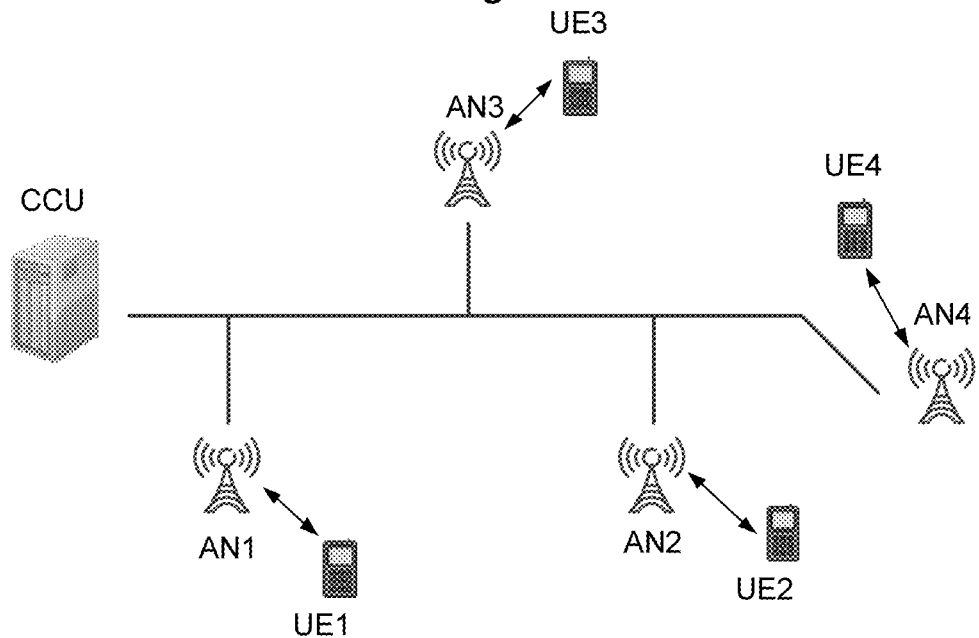
FIG. 1 schematically shows one example of the future mobile networks.

In mathematical modeling of wireless networks, a network geometry usually refers to relative locations of nodes, such as transmitters and receivers. It is used to represent aspects of network where (for example, cellular networks) the underlying geometry plays a fundamental role due to the interference of other transmitters of different locations. For example, for UE1 as shown in FIG. 1, its network geometry may refer to location of UE1 in the coverage served by AN1. It should be noted that the location here refers either to a geographical location of the UE within the coverage, or to a "virtual" location in terms of UE's signal quality or strength within the coverage. For example, such a location may be characterized by a pilot signal quality of AN1. The pilot signal quality of AN1 is indicated by one of, e.g., a reference signal strength of AN1; a reference signal SINR of AN1; or a reference signal strength of AN1 and reference signal strength of one or more neighboring radio nodes of AN1 (e.g., AN2 or AN3 as shown in FIG. 1).

According to the present disclosure, a relatively lower/higher carrier sensing threshold (also called as a RX power threshold) is applied to determine the channel availability for a link at an AP-coverage edge/center (simply referred to as edge/center herein after). This is because that the node close to edge of a cell has a relatively higher probability to interfere the neighboring-cell radio links (shorter distance to neighbor cells for UL, and confined elevation beamforming (BF) for DL). Similarly, the node close to the center of a cell has a relatively lower probability to interfere the neighboring-cell radio links (larger distance to neighbor cells for UL). By this way, the channel availability of the center links can be maximized without a substantial interference increase to neighbor cells, eventually, the overall spectrum utilization is improved.

Figure 2:
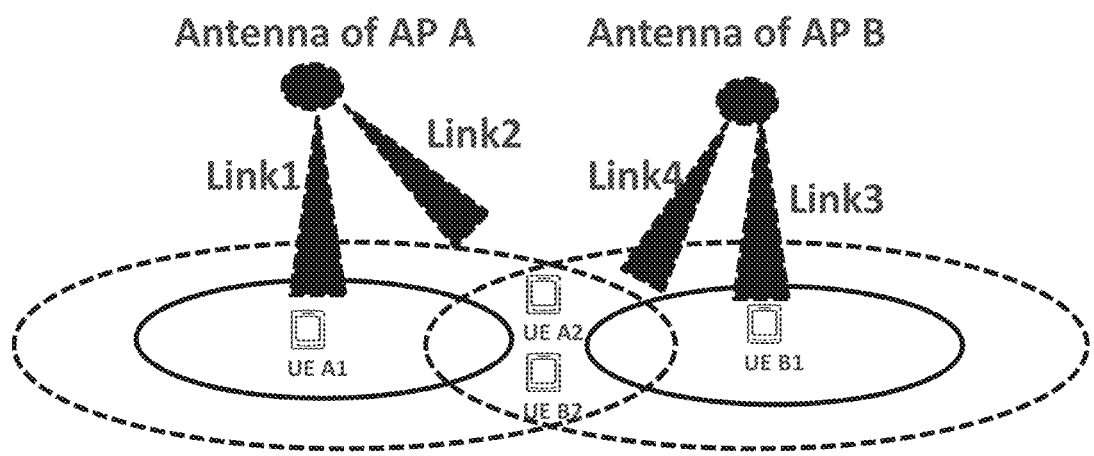
FIG. 2 illustrates an exemplary scenario showing one concept of the present disclosure.

FIG. 2 illustrates an exemplary scenario showing one concept of the present disclosure.

As shown in FIG. 2, there are two neighboring radio nodes, i.e., AP A and AP B, and it is assumed that AP A and AP B are deployed in the ceil of a house. UE A1 and UE A2 are both served by AP A, and the former is located in the center of AP A's coverage and the latter is located in the edge of AP A's coverage. Similarly, UE B1 and UE B2 are both served by AP B, and the former is located in the center of AP B's coverage and the latter is located in the edge of AP B's coverage. It is assumed that UE A1, UE A2, UE B1 and UE B2 are all deployed in the floor of the house. As illustrated, AP A's coverage is partly overlapped with AP B's coverage.

In such a scenario, Uplink (UL) TX beam/Downlink (DL) TX beam of Link 1 from UE A1 to AP A or from AP A to UE A1 reaches the ceil or the floor first and only some reflected rays may reach AP B's coverage. Similarly, UL TX beam/DL TX beam of Link 3 from UE B1 to AP B or from AP B to UE B1 reaches the ceil or the floor first and only some reflected rays may reach AP A's coverage. The generated interference from Link 1 to Link 3 and Link 4 (AP B-UE B2) can be endurable even though Link 1 transmits simultaneously with Link 3 or 4. It is similar for Link 3 to transmit simultaneously with Link 1 or Link 2 (AP A-UE A2).

So, it can be seen that links located in the center of a coverage may generate less interference to neighbor links, with compared to link located in the edge of the coverage. Hence, it may be beneficial to use a higher carrier sensing threshold for links located in the center of the coverage. Considering the coverage depends on the radio node, to put it differently, a higher carrier sensing threshold may be used for UEs located in the center of the coverage.

Figure 3:
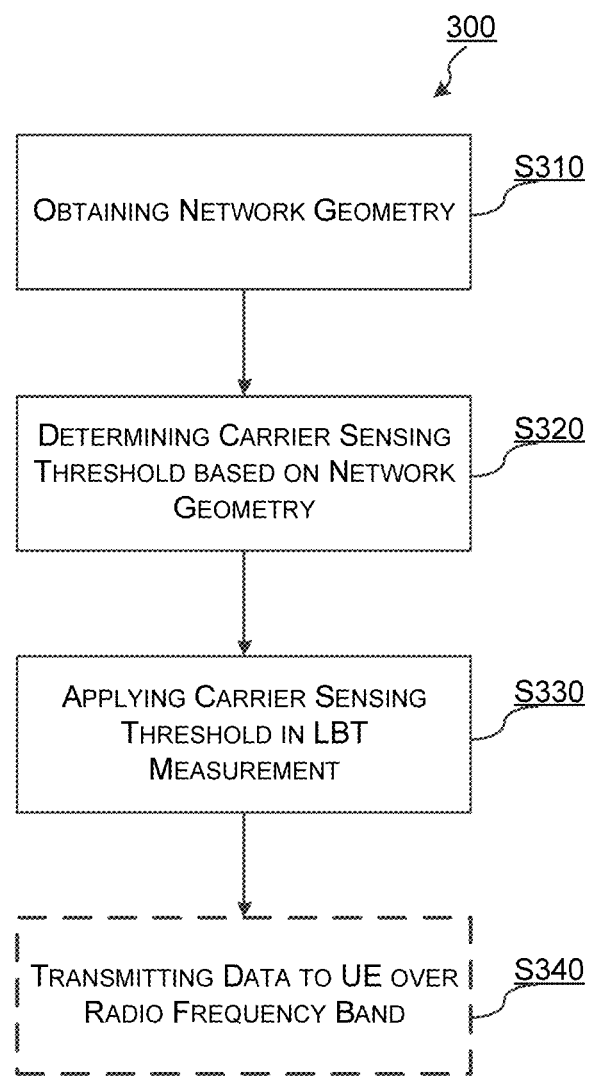
FIGS. 3-4 schematically illustrate a method 300 used in a radio node according to embodiments of the present disclosure.

FIG. 3 schematically illustrates a method 300 used in a radio node according to embodiments of the present disclosure. It is assumed that the radio node is to transmit data to a UE served by the radio node over a radio frequency band.

At step S310, the radio node obtains a network geometry of the UE with respect to a coverage served by the radio node. This may be done in various well-known manners in the art.

In an implementation, the network geometry includes location of the UE in the coverage. Furthermore, the location of the UE in the coverage may be characterized by a pilot signal quality of the radio node. The pilot signal quality of the radio node is indicated by one of: a reference signal strength of the radio node; a reference signal SINR of the radio node; or a reference signal strength of the radio node and reference signal strength of one or more neighboring radio nodes of the radio node.

For example, when one UE has one or multiple neighboring ANs, the relative geometry may be determined according to the relative quality difference between the serving AN and the strongest neighboring AN:

$$L_R = P_{rx,A} - \max \{P_{rx,N1}, P_{rx,N2}, \ldots P_{rx,NX}\}$$

where $L_R$ is the relative geometry; $P_{rx,N1}, P_{rx,N2} \ldots P_{rx,NX}$ are the received pilot power from X neighboring ANs respectively.

At step S320, the radio node determines a carrier sensing threshold for the UE based on the network geometry. The carrier sensing threshold is used for LBT measurement over the radio frequency band applicable for transmitting data to the UE.

In an implementation, the carrier sensing threshold may be adjusted to be larger if the UE moves towards the center of the coverage. Alternatively, the carrier sensing threshold may be adjusted to be smaller if the UE moves towards the edge of the coverage.

At step S330, the radio node applies the carrier sensing threshold in the LBT measurement.

Figure 4:
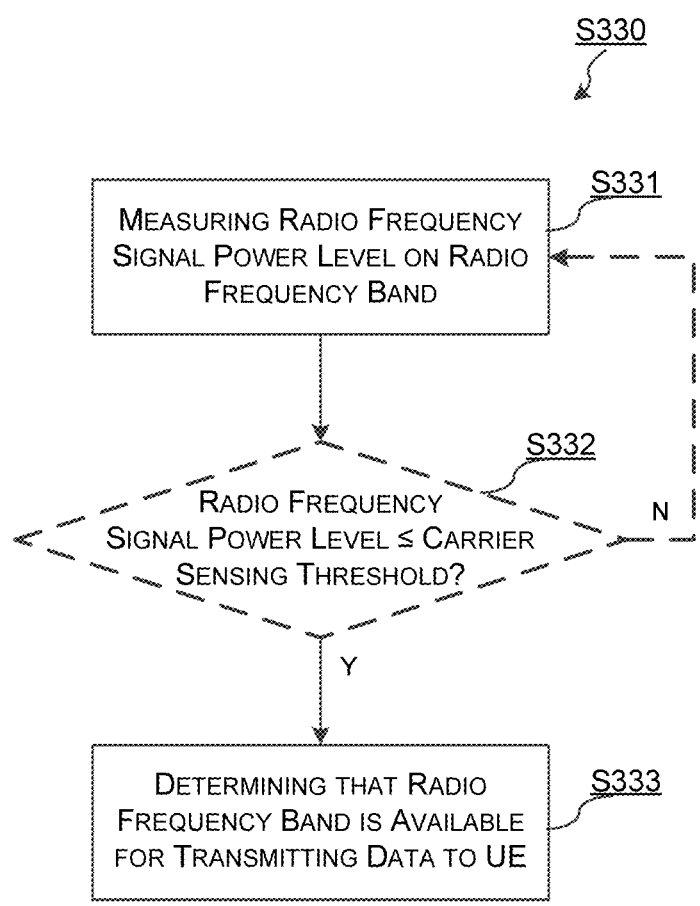

In an implementation, step S330 may include steps S331, S332, and S333 as illustrated in FIG. 4.

At step S331, the radio node measures a radio frequency signal power level on the radio frequency band. Conventionally, before such a measuring, the radio node may listen to the radio frequency band periodically or in a fixed interval.

At step S332, the radio node compares the measured radio frequency signal power level with the carrier sensing threshold.

If the radio frequency signal power level is smaller than or equal to the carrier sensing threshold ("Y" branch in FIG. 4), this means that the radio frequency band is available currently. Then, the flowchart proceeds to step S333, where the radio node determines that the radio frequency band is available for transmitting data to the UE. In this case, the method 300 proceeds to step S340.

At step S340, the radio node transmits data to the UE over the radio frequency band.

If the radio frequency signal power level is larger than the carrier sensing threshold ("N" branch in FIG. 4), this means that the radio frequency band is being occupied, e.g., by other radio nodes. In this case, the flowchart goes back to step S331 to continue with the LBT measurement again.

Figure 5:
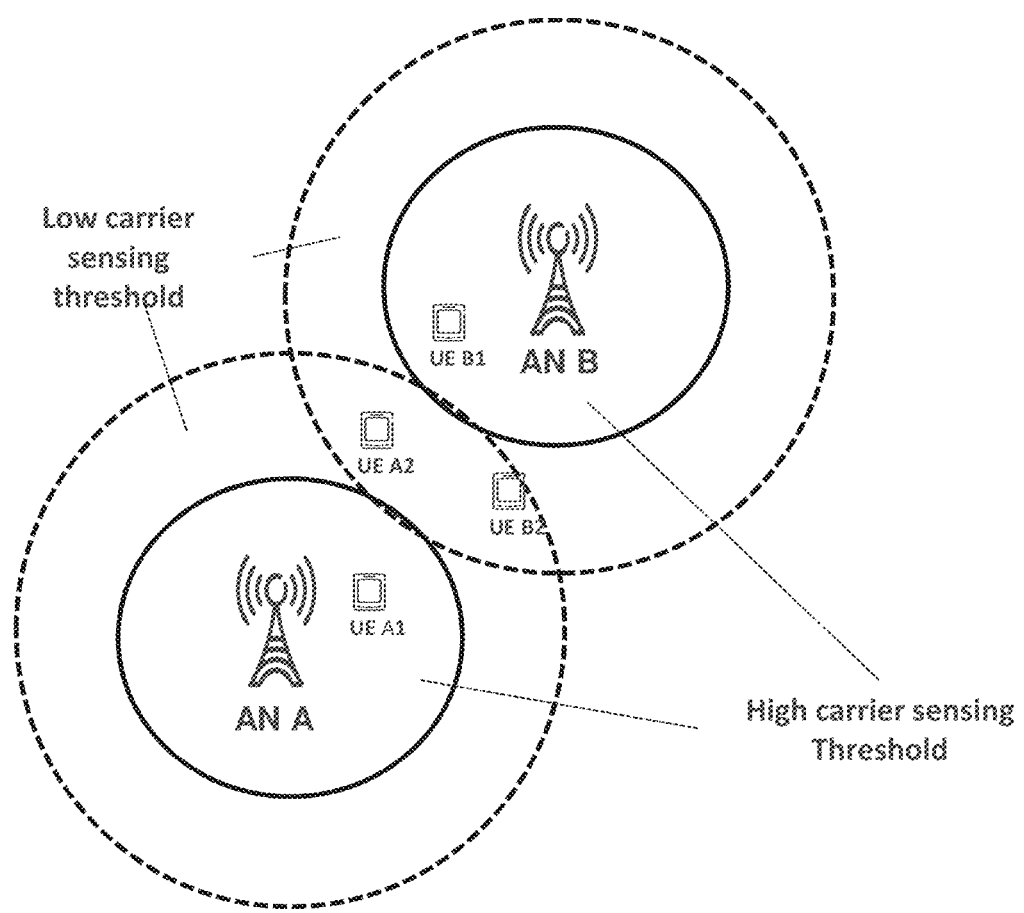
FIG. 5 illustrates one exemplary scenario showing how to adapt carrier sensing thresholds based on the network geometry according to embodiments of the present disclosure.

FIG. 5 illustrates one exemplary scenario showing how to adapt carrier sensing thresholds according to the network geometry according to embodiments of the present disclosure.

As shown in FIG. 5, UE A1 and UE B1 are located in the center of AN A's coverage and AN B's coverage, respectively, so they may be called as center UEs. UE A2 and UE B2 are located in the edge of respective coverage, and thus may be called as edge UEs.

According to the present disclosure, high carrier sensing thresholds are applied to the center UEs, and low carrier sensing thresholds are applied to the edge UEs. Please be noted that the terms "high" and "low" here are relative with respect to each other. For example, as compared to a carrier sensing threshold for UE A2, a higher one may be applied to UE A1.

The carrier sensing threshold can be adapted to determine the channel availability.

For example, the carrier sensing threshold may be dynamically derived based on a predefined mapping table (see Table 1 below) between the measured geometry and the absolute carrier sensing threshold value. Then the radio node may determine the channel availability by comparing the measured geometry to the determined absolute carrier sensing threshold:

TABLE 1 geometry to carrier sensing threshold mapping table

| Condition | Carrier sensing threshold ($Th_{ad}$) |
| --- | --- |
| Measured geometry <= low threshold | low carrier sensing threshold |
| Measured geometry > low threshold | high carrier sensing threshold |

On exemplary rule to determine the channel availability is as follows:
 ◇ If $L_A \leq Th_{ad}$, channel is determined to be available, wherein $L_A$ refers to the geometry;
 ◇ Else, channel is determined to be busy.

The method 300 may be also applied in a UE, such as UE1 as shown in FIG. 1.

Figure 6:
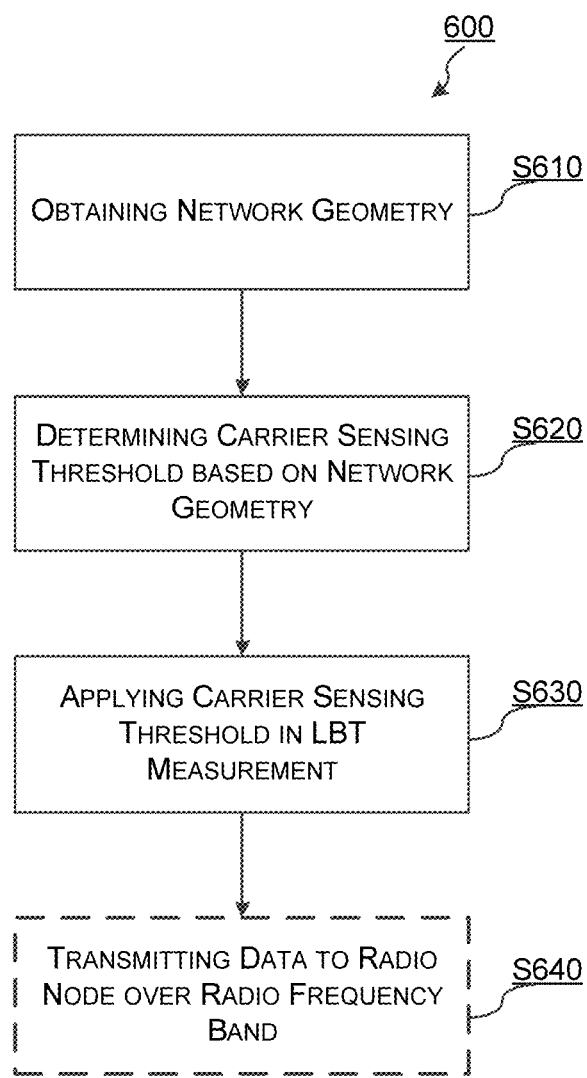
FIGS. 6-7 schematically illustrate a method 600 used in a UE according to embodiments of the present disclosure.

FIG. 6 schematically illustrates a method 600 used in a UE according to embodiments of the present disclosure. It is assumed that the UE is to transmit data to its serving radio node over a radio frequency band. Here, the radio frequency band refers to one or more radio frequency sub-bands or one or more carriers implemented by one or more antennas.

At step S610, the UE obtains a network geometry of the UE with respect to a coverage served by the radio node. This may be done in various well-known manners in the art.

In an implementation, the network geometry includes location of the UE in the coverage. Furthermore, the location of the UE in the coverage may be characterized by a pilot signal quality of the radio node. The pilot signal quality of the radio node is indicated by one of: a reference signal strength of the radio node; a reference signal SINR of the radio node; or a reference signal strength of the radio node and reference signal strength of one or more neighboring radio nodes of the radio node.

At step S620, the UE determines a carrier sensing threshold for the UE based on the network geometry. The carrier sensing threshold is used for LBT measurement over a radio frequency band applicable for transmitting data to the radio node.

In an implementation, the carrier sensing threshold may be adjusted to be larger if the UE moves towards the center of the coverage. Alternatively, the carrier sensing threshold may be adjusted to be smaller if the UE moves towards the edge of the coverage.

At step S630, the UE applies the carrier sensing threshold in the LBT measurement. This step is similar to step S330.

Figure 7:
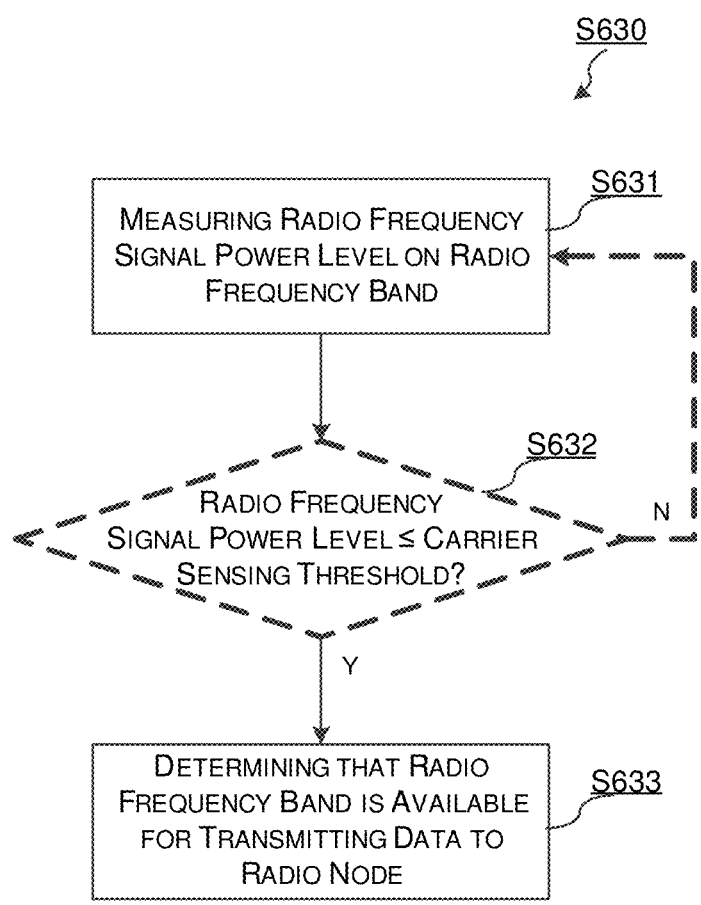

For example, step S630 may include steps S631, S632, and S633 as illustrated in FIG. 7.

At step S631, the UE measures a radio frequency signal power level on the radio frequency band. Conventionally, before such a measuring, the UE may listen to the radio frequency band periodically or in a fixed interval. This step is similar to step S331.

At step S632, the UE compares the measured radio frequency signal power level with the carrier sensing threshold.

If the radio frequency signal power level is smaller than or equal to the carrier sensing threshold ("Y" branch in FIG. 7), this means that the radio frequency band is available currently. Then, the flowchart proceeds to step S633, where the UE determines that the radio frequency band is available for transmitting data to its serving radio node. In this case, the method 600 proceeds to step S640.

At step S640, the UE transmits data to the radio node over the radio frequency band.

If the radio frequency signal power level is larger than the carrier sensing threshold ("N" branch in FIG. 7), this means that the radio frequency band is being occupied, e.g., by other UEs or radio nodes. In this case, the flowchart goes back to step S631 i.e., to continue with the LBT measurement again.

The present disclosure further proposes to adapt a width of the RX beam for a radio node according to the network geometry.

With high gain beamforming, the highest beamforming gain can only be achieved when the RX beam of the receiver well targets to the transmitter and the TX beam of the transmitter well targets to the receiver.

Figure 8:
FIG. 8 illustrates exemplary wireless systems in which high gain beamforming is applied.
Figure 8:

FIG. 8 illustrates exemplary wireless systems in which high gain beamforming is applied. The left part of FIG. 8 shows that the TX beam and RX beam are well matched and maximum beamforming gain can be achieved. The right part of FIG. 8 shows that the TX beam and RX beam are not matched, and the sub-optimal beamforming gain is achieved. In some cases, the beamforming gain could be even lower than using wider TX and RX beams due to only side lobe reaches the incoming direction of the RX beam.

Deafness could occur in the wireless systems with high gain beamforming as shown in FIG. 8. For instance, the receiver may not hear the transmitter when there is a large mismatch between the RX beam of the receiver and the TX beam of the transmitter. The deafness probability becomes higher when the TX beam and/or the RX beam are narrower.

To mitigate such deafness by using the TX and/or RX beam sweeping results in large overhead and considerable delay for the subsequent data transmission, the present disclosure proposes to conditionally determine the RX beam according to the network geometry. To be specific, the present disclosure proposes to adapt the RX beam's width based on the network geometry.

Figure 9:
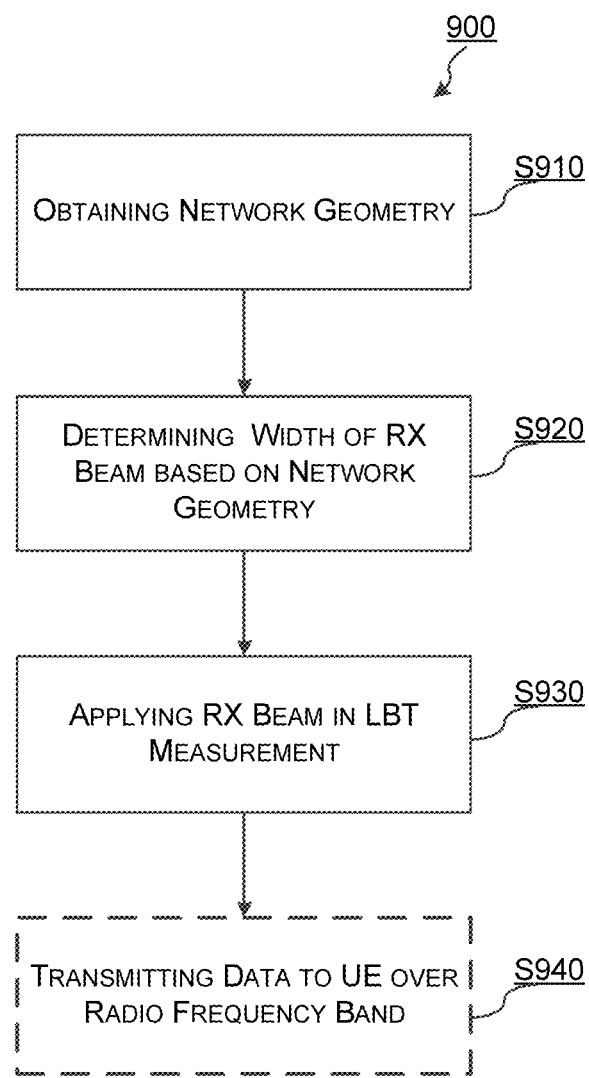
FIGS. 9-10 schematically illustrate a method 900 used in a radio node according to embodiments of the present disclosure.

FIG. 9 schematically illustrates a method 900 used in a radio node according to embodiments of the present disclosure. It is assumed that the radio node is to transmit data to a UE served by the radio node over a radio frequency band.

At step S910, the radio node obtains a network geometry of the UE with respect to a coverage served by the radio node. This may be done in various well-known manners in the art.

In an implementation, the network geometry includes location of the UE in the coverage. Furthermore, the location of the UE in the coverage may be characterized by a pilot signal quality of the radio node. The pilot signal quality of the radio node is indicated by one of: a reference signal strength of the radio node; a reference signal SINR of the radio node; or a reference signal strength of the radio node and reference signal strength of one or more neighboring radio nodes of the radio node.

At step S920, the radio node determines a width of a RX beam based on the network geometry. The RX beam is used for LBT measurement over a radio frequency band applicable for transmitting data to the UE.

In an implementation, the width of the RX beam may be adjusted to be wider if the UE moves towards the center of the coverage. Alternatively, the width of the RX beam may be adjusted to be narrower if the UE moves towards the edge of the coverage.

At step S930, the radio node applies the RX beam with the determined width in the LBT measurement.

Figure 10:
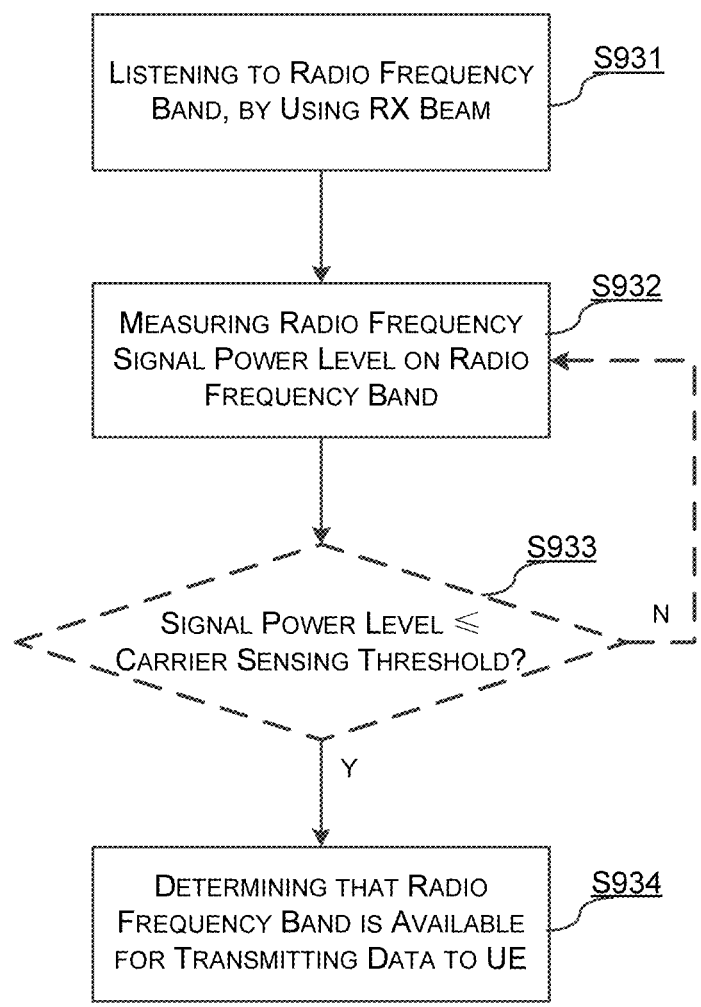

In an implementation, step S930 may include steps S931, S932, S933 and S934 as illustrated in FIG. 10.

At step S931, the radio node listens to the radio frequency band, by using a RX beam.

At step S932, the radio node measures a radio frequency signal power level on the radio frequency band.

At step S933, the radio node compares the measured radio frequency signal power level with a predetermined carrier sensing threshold. The predetermined carrier sensing threshold may be determined by the radio node in various manners. For example, the predetermined carrier sensing threshold may be determined as done in the method 300. Alternatively, the predetermined carrier sensing threshold may be configured by the radio node in advance and keeps fixed for different UEs.

If the radio frequency signal power level is smaller than or equal to the predetermined carrier sensing threshold ("Y" branch in FIG. 10), this means that the radio frequency band is available currently. Then, the flowchart proceeds to step S934, where the radio node determines that the radio frequency band is available for transmitting data to the UE. In this case, the method 900 proceeds to step S940.

At step S940, the radio node transmits data to the UE over the radio frequency band.

If the radio frequency signal power level is larger than the predetermined carrier sensing threshold ("N" branch in FIG. 10), this means that the radio frequency band is being occupied, e.g., by other radio nodes. In this case, the flowchart goes back to step S931 to continue with the LBT measurement again.

With the method 900, the present disclosure can relieve the deafness problem brought by the use of high gain beamforming.

Furthermore, adapting the RX beam width can also avoid the overhead of beam forming training. To be specific, wide TX and/or RX beam can be used for a data block, whose block size is smaller than a predetermined threshold or whose channel occupation time is shorter than another predetermined threshold.

Figure 11:
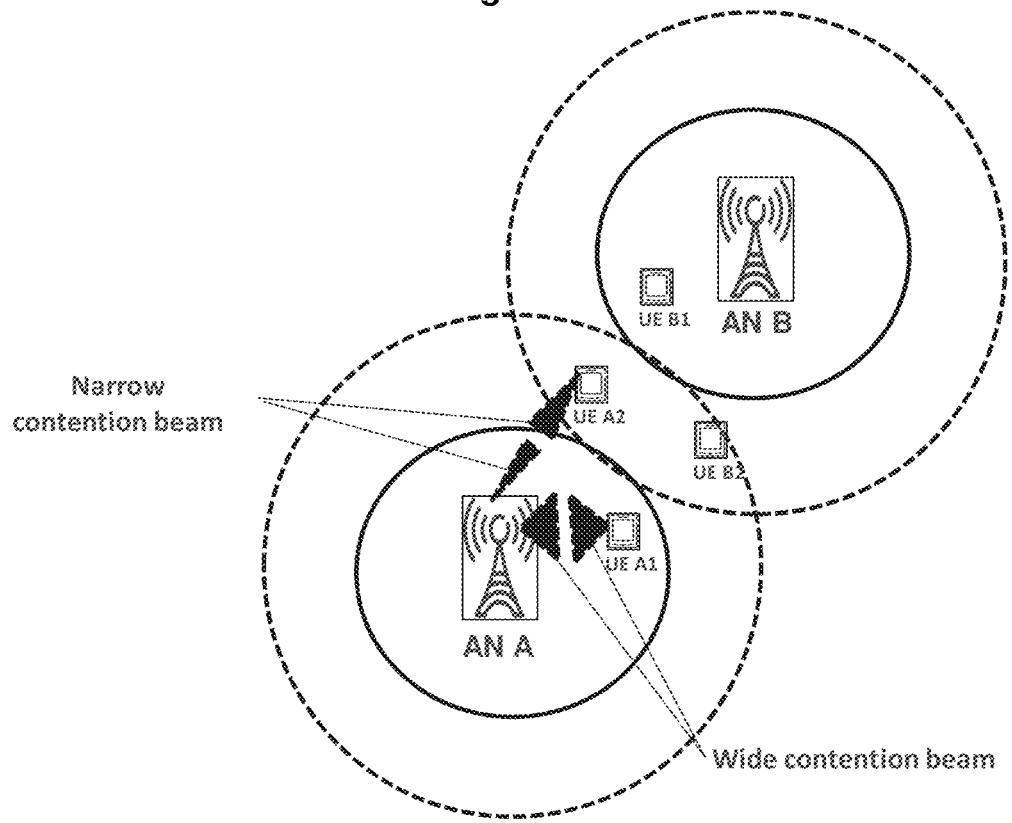
FIG. 11 illustrates one exemplary scenario showing how to adapt RX beams based on the network geometry according to embodiments of the present disclosure.

FIG. 11 illustrates one exemplary scenario showing how to adapt RX beams according to the network geometry according to embodiments of the present disclosure.

As shown in FIG. 11, UE A1 and UE B1 are located in the center of AN A's coverage and AN B's coverage, respectively, so they may be called as center UEs. UE A2 and UE B2 are located in the edge of respective coverage, and thus may be called as edge UEs.

According to the present disclosure, wide RX beams are applied to the UEs close to the center of the coverage, and narrow carrier sensing thresholds are applied to the UEs close to the edge of the coverage. Please be noted that the terms "wide" and "narrow" here are relative with respect to each other. For example, as compared to a RX beam for UE A2, a wider one may be applied to UE A1.

Similarly, a mapping table like Table 1 may be predefined to dynamically derive the RX beams. For example, such a table may be defined between the measured network geometry and the absolute RX beams.

Figure 12:
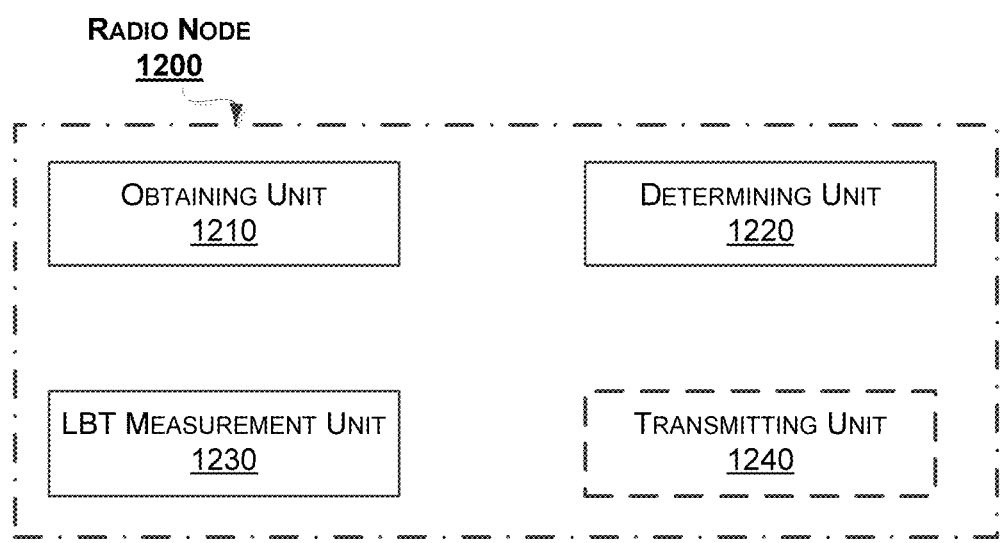
FIG. 12 is a schematic block diagram of a radio node 1200 according to embodiments of the present disclosure.

FIG. 12 is a schematic block diagram of a radio node 1200 according to embodiments of the present disclosure. The radio node 1200 serves one or more UEs which are connected to the radio node via one or more links, in a coverage area. For example, the radio node 1200 may be AN A as shown in FIG. 5, which serves UE A1 and UE A2.

As shown in FIG. 12. The radio node 1200 comprises an obtaining unit 1210, a determining unit 1220, an LBT measurement unit 1230, and a transmitting unit 1240. The transmitting unit 1240 is optional.

The obtaining unit 1210 is configured to obtain a network geometry of the UE with respect to a coverage served by the radio node. This may be done in various well-known manners in the art.

In an implementation, the network geometry includes location of the UE in the coverage. Furthermore, the location of the UE in the coverage may be characterized by a pilot signal quality of the radio node. The pilot signal quality of the radio node is indicated by one of: a reference signal strength of the radio node; a reference signal SINR of the radio node; or a reference signal strength of the radio node and reference signal strength of one or more neighboring radio nodes of the radio node.

The determining unit 1220 is configured to determine a carrier sensing threshold for the UE based on the network geometry. The carrier sensing threshold is used for LBT measurement over a radio frequency band applicable for transmitting data to the UE.

In an implementation, the determining unit 1220 may adjust the carrier sensing threshold to be larger if the UE moves towards the center of the coverage. Alternatively, the determining unit 1220 may adjust the carrier sensing threshold to be smaller if the UE moves towards the edge of the coverage. This is illustrated in FIG. 5 by way of an example.

The LBT measurement unit 1230 is configured to apply the carrier sensing threshold in the LBT measurement.

In an implementation, the LBT measurement unit 1230 is further configured to: measure a radio frequency signal power level on the radio frequency band; and determine that the radio frequency band is available for transmitting data to the UE if the radio frequency signal power level is smaller than or equal to the carrier sensing.

The transmitting unit 1240 is configured to transmit data to the UE over the radio frequency band when the radio frequency band is available for transmitting data to the UE.

It should be noted that two or more different units in this disclosure may be logically or physically combined. For example, the obtaining unit 1210 and the determining unit 1220 may be combined as one single unit, e.g., a processor in the radio node.

The radio node 1200 may be also embodied on a radio node comprising a transceiver, a processor and a memory. The memory contains instructions executable by the processor whereby the radio node is operative to perform the method 300.

Figure 13:
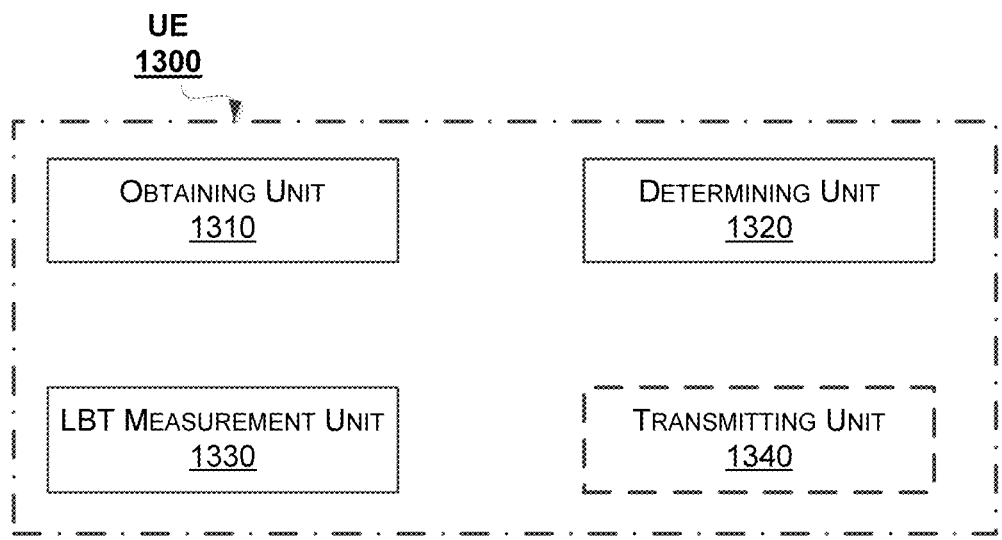
FIG. 13 is a schematic block diagram of a UE 1300 according to embodiments of the present disclosure.

FIG. 13 is a schematic block diagram of a UE 1300 according to embodiments of the present disclosure. The UE 1300 is served by a radio node, which serves one or more UEs which are connected to the radio node via one or more links, in a coverage area. For example, UE 1300 may be UE A1 as shown in FIG. 5, which is served by AN A.

As shown in FIG. 13. The UE 1300 comprises an obtaining unit 1310, a determining unit 1320, an LBT measurement unit 1330, and a transmitting unit 1340. The transmitting unit 1340 is optional.

The obtaining unit 1310 is configured to obtain a network geometry of the UE with respect to a coverage served by the radio node. This may be done in various well-known manners in the art.

In an implementation, the network geometry includes location of the UE in the coverage. Furthermore, the location of the UE in the coverage may be characterized by a pilot signal quality of the radio node. The pilot signal quality of the radio node is indicated by one of: a reference signal strength of the radio node; a reference signal SINR of the radio node; or a reference signal strength of the radio node and reference signal strength of one or more neighboring radio nodes of the radio node.

The determining unit 1320 is configured to determine a carrier sensing threshold for the UE based on the network geometry. The carrier sensing threshold is used for LBT measurement over a radio frequency band applicable for transmitting data to the radio node.

In an implementation, the determining unit 1320 may adjust the carrier sensing threshold to be larger if the UE moves towards the center of the coverage. Alternatively, the determining unit 1320 may adjust the carrier sensing threshold to be smaller if the UE moves towards the edge of the coverage. This is illustrated in FIG. 5 by way of an example.

The LBT measurement unit 1330 is configured to apply the carrier sensing threshold in the LBT measurement.

In an implementation, the LBT measurement unit 1330 is further configured to: measure a radio frequency signal power level on the radio frequency band; and determine that the radio frequency band is available for transmitting data to the radio node if the radio frequency signal power level is smaller than or equal to the carrier sensing threshold.

The transmitting unit 1340 is configured to transmit data to the radio node over the radio frequency band when the radio frequency band is available for transmitting data to the UE.

It should be noted that two or more different units in this disclosure may be logically or physically combined. For example, the obtaining unit 1310 and the determining unit 1320 may be combined as one single unit, e.g., a processor in the UE.

The UE 1300 may be also embodied on a UE comprising a transceiver, a processor and a memory. The memory contains instructions executable by the processor whereby the UE is operative to perform the method 600.

Figure 14:
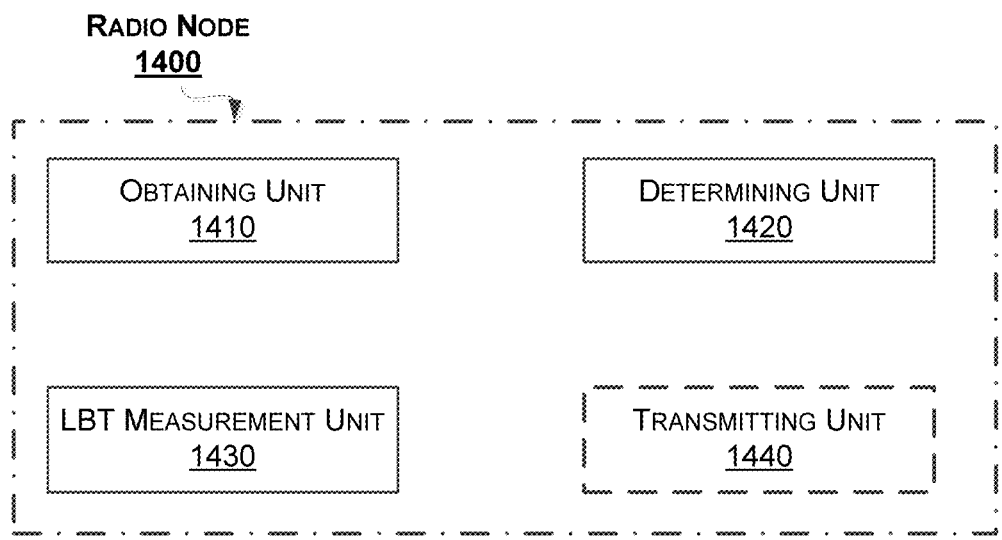
FIG. 14 is a schematic block diagram of a radio node 1400 according to embodiments of the present disclosure.

FIG. 14 is a schematic block diagram of a radio node 1400 according to embodiments of the present disclosure. The radio node 1400 serves one or more UEs which are connected to the radio node via one or more links, in a coverage area. For example, the radio node 1400 may be AN A as shown in FIG. 11, which serves UE A1 and UE A2.

As shown in FIG. 14. The radio node 1400 comprises an obtaining unit 1410, a determining unit 1420, an LBT measurement unit 1430, and a transmitting unit 1440. The transmitting unit 1440 is optional.

The obtaining unit 1410 is configured to obtain a network geometry of the UE with respect to a coverage served by the radio node. This may be done in various well-known manners in the art.

In an implementation, the network geometry includes location of the UE in the coverage. Furthermore, the location of the UE in the coverage may be characterized by a pilot signal quality of the radio node. The pilot signal quality of the radio node is indicated by one of: a reference signal strength of the radio node; a reference signal SINR of the radio node; or a reference signal strength of the radio node and reference signal strength of one or more neighboring radio nodes of the radio node.

The determining unit 1420 is configured to determine a width of a RX beam based on the network geometry. The RX beam is used for LBT measurement over a radio frequency band applicable for transmitting data to the UE.

In an implementation, the determining unit 1420 may adjust the width to be wider if the UE moves towards the center of the coverage. Alternatively, the determining unit 1420 may adjust the width to be narrower if the UE moves towards the edge of the coverage. This is illustrated in FIG. 11 by way of an example.

The LBT measurement unit 1430 is configured to apply the RX beam with the determined width in the LBT measurement.

In an implementation, the LBT measurement unit 1430 is further configured to: listen to the radio frequency band, by using the RX beam; measure a radio frequency signal power level on the radio frequency band; and determine that the radio frequency band is available for transmitting data to the UE if the radio frequency signal power level is smaller than or equal to a predetermined carrier sensing threshold.

The transmitting unit 1440 is configured to transmit data to the UE over the radio frequency band the radio frequency band is available for transmitting data to the UE.

It should be noted that two or more different units in this disclosure may be logically or physically combined. For example, the obtaining unit 1410 and the determining unit 1420 may be combined as one single unit, e.g., a processor in the radio node.

Figure 15:
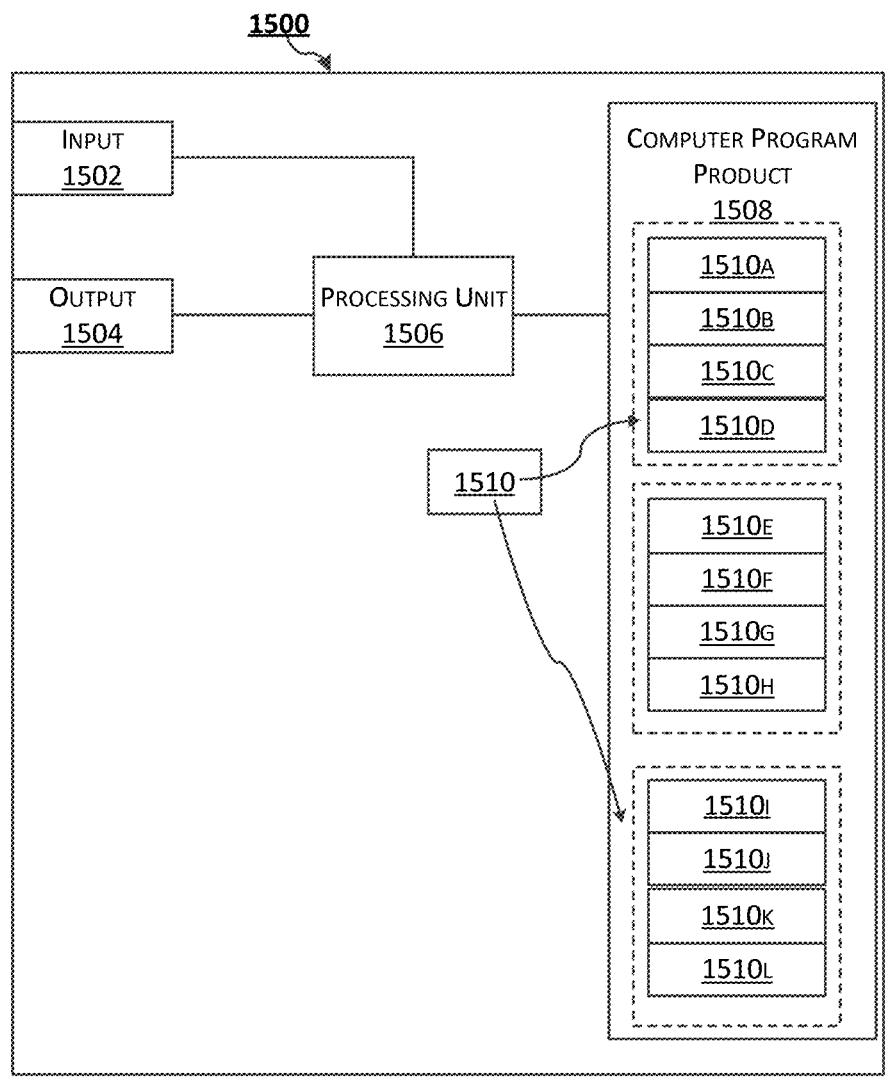
FIG. 15 schematically shows an embodiment of an arrangement 1500 comprising at least one particular computer program product 1508 according to a particular embodiment of the present disclosure.

FIG. 15 schematically shows an embodiment of an arrangement 1500 comprising at least one particular computer program product 1508 according to a particular embodiment of the present disclosure. The arrangement 1500 may be used in the radio node 1200, UE 1300, or the radio node 1400 according to the present disclosure. Comprised in the arrangement 1500 are here a processing unit 1506, e.g., with a Digital Signal Processor (DSP). The processing unit 1506 may be a single unit or a plurality of units to perform different actions of procedures described herein. The arrangement 1500 may also comprise an input unit 1502 for receiving signals from other entities, and an output unit 1504 for providing signal(s) to other entities. The input unit and the output unit may be arranged as an integrated entity or as illustrated in the example of FIG. 12, FIG. 13, or FIG. 14.

Furthermore, the at least one computer program product 1508 may be in the form of a non-volatile or volatile memory, e.g., an Electrically Erasable Programmable Read-Only Memory (EEPROM), a flash memory and a hard drive. The computer program product 1508 comprises a computer program 1510, which comprises code/computer readable instructions, which when executed by the processing unit 1506 in the arrangement 1500 causes the arrangement 1500 and/or the network node or the UE in which it is comprised to perform the actions, e.g., of the procedure described earlier in conjunction with either of FIGS. 3, 6 and 9.

The computer program 1510 may be configured as a computer program code structured in computer program modules 1510A-1510D, 1510E-1510H, or 1510I-1510L. Hence, in an exemplifying embodiment when the arrangement 1500 is used in the radio node 1200, the code in the computer program of the arrangement 1500 includes an obtaining module 1510A, for obtaining a network geometry of a UE served by the radio node with respect to a coverage served by the radio node. The code in the computer program 1510 further includes a determining module 1510B, for determining a carrier sensing threshold for the UE based on the network geometry, the carrier sensing threshold for use in Listen-Before-Talk (LBT) measurement over a radio frequency band applicable for transmitting data to the UE. The code in the computer program 1510 may further include an LBT measurement module 1510C, for applying the carrier sensing threshold in the LBT measurement. The code in the computer program 1510 may comprise further modules, illustrated as module 1510D, e.g. for controlling and performing other related procedures associated with the radio node's operations.

In yet another exemplifying embodiment when the arrangement 1500 is used in the UE 1300, the code in the computer program of the arrangement 1500 includes an obtaining module 1510E, for obtaining a network geometry of a UE served by the radio node with respect to a coverage served by the radio node. The code in the computer program 1510 further includes a determining module 1510F, for determining a carrier sensing threshold for the UE based on the network geometry, the carrier sensing threshold for use in Listen-Before-Talk (LBT) measurement over a radio frequency band applicable for transmitting data to the radio node. The code in the computer program 1510 may further include a LBT measurement module 1510G, for applying the carrier sensing threshold in the LBT measurement. The code in the computer program 1510 may comprise further modules, illustrated as module 1510H, e.g. for controlling and performing other related procedures associated with the UE's operations.

In another exemplifying embodiment when the arrangement 1500 is used in the radio node 1400, the code in the computer program of the arrangement 1500 includes an obtaining module 1510I, for obtaining a network geometry of a UE served by the radio node with respect to a coverage served by the radio node. The code in the computer program 1510 further includes a determining module 1510J, for determining a width of a RX beam based on the network geometry, the RX beam for use in Listen-Before-Talk (LBT) measurement over a radio frequency band applicable for transmitting data to the UE. The code in the computer program 1510 may further include a LBT measurement module 1510K, for applying the RX beam with the determined width in the LBT measurement. The code in the computer program 1510 may comprise further modules, illustrated as module 1510L, e.g. for controlling and performing other related procedures associated with the radio node's operations.

The computer program modules could essentially perform the actions of the flow illustrated in FIG. 3, to emulate the radio node 1200, or the actions of the flow illustrated in FIG. 6, to emulate the UE 1300, or the actions of the flow illustrated in FIG. 9 to emulate the radio node 1400. In other words, when the different computer program modules are executed in the processing unit 1506, they may correspond, e.g., to the units 1210-1230 of FIG. 12, or to the units 1310-1330 of FIG. 13, or to the units 1410-1430 of FIG. 14.

Although the code means in the embodiments disclosed above in conjunction with FIG. 15 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method used in a radio node, the method comprising:
   obtaining a network geometry of a User Equipment (UE) served by the radio node with respect to a coverage served by the radio node;
   determining a width of a Receiver (RX) beam based on the network geometry, the RX beam for use in Listen-Before-Talk (LBT) measurement over a radio frequency band applicable for transmitting data to the UE; and
   applying the RX beam with the determined width in the LBT measurement.

2. The method according to claim 1, wherein applying the RX beam with the determined width in the LBT measurement comprises:
   listening to the radio frequency band, by using the RX beam;
   measuring a radio frequency signal power level on the radio frequency band; and
   determining that the radio frequency band is available for transmitting data to the UE if the radio frequency signal power level is smaller than or equal to a predetermined carrier sensing threshold, and
   wherein the method further comprises transmitting data to the UE over the radio frequency band.

3. The method according to claim 1, wherein the network geometry includes a location of the UE in the coverage.

4. The method according to claim 3, wherein determining the width of the RX beam based on the network geometry comprises:
   adjusting the width to be wider if the UE moves towards the center of the coverage; and/or
   adjusting the width to be narrower if the UE moves towards the edge of the coverage.

5. The method according to claim 3, wherein the location of the UE in the coverage is characterized by a pilot signal quality of the radio node.

6. The method according to claim 5, wherein the pilot signal quality of the radio node is indicated by one of:
   a reference signal strength of the radio node;
   a reference signal Signal to Interference plus Noise Ratio (SINR) of the radio node; and
   the reference signal strength of the radio node and a reference signal strength of one or more neighboring radio nodes of the radio node.

7. A radio node, comprising:
   a processor and a non-transitory computer readable medium containing instructions, which when executed by the processor, causing the radio node to:
   obtain a network geometry of a User Equipment (UE) served by the radio node with respect to a coverage served by the radio node,
   determine a width of a Receiver (RX) beam based on the network geometry, the RX beam for use in Listen-Before-Talk (LBT) measurement over a radio frequency band applicable for transmitting data to the UE, and
   apply the RX beam with the determined width in the LBT measurement.

8. The radio node according to claim 7, wherein the radio node is further configured to:
   listen to the radio frequency band, by using the RX beam,
   measure a radio frequency signal power level on the radio frequency band,
   determine that the radio frequency band is available for transmitting data to the UE if the radio frequency signal power level is smaller than or equal to a predetermined carrier sensing threshold, and
   transmit data to the UE over the radio frequency band.

9. The radio node according to claim 7, wherein the network geometry includes a location of the UE in the coverage.

10. The radio node according to claim 9, wherein the radio node is further configured to:
    adjust the width to be wider if the UE moves towards the center of the coverage; and/or
    adjust the width to be narrower if the UE moves towards the edge of the coverage.

11. The radio node according to claim 9, wherein the location of the UE in the coverage is characterized by a pilot signal quality of the radio node.

12. The radio node according to claim 11, wherein the pilot signal quality of the radio node is indicated by one of:
    a reference signal strength of the radio node;

a reference signal Signal to Interference plus Noise Ratio (SINR) of the radio node; and the reference signal strength of the radio node and a reference signal strength of one or more neighboring radio nodes of the radio node.

13. A non-transitory computer readable medium that contains instructions, which when executed by a processor of a radio node, causing the radio node to:

obtain a network geometry of a User Equipment (UE) served by the radio node with respect to a coverage served by the radio node, determine a width of a Receiver (RX) beam based on the network geometry, the RX beam for use in Listen-Before-Talk (LBT) measurement over a radio frequency band applicable for transmitting data to the UE, and apply the RX beam with the determined width in the LBT measurement.

14. The non-transitory computer readable medium according to claim 13, wherein the radio node is further configured to:

listen to the radio frequency band, by using the RX beam, measure a radio frequency signal power level on the radio frequency band, and determine that the radio frequency band is available for transmitting data to the UE if the radio frequency signal power level is smaller than or equal to a predetermined carrier sensing threshold, and transmit data to the UE over the radio frequency band.

15. The non-transitory computer readable medium according to claim 13, wherein the network geometry includes a location of the UE in the coverage.

16. The non-transitory computer readable medium according to claim 15, wherein the radio node is further configured to:

adjust the width to be wider if the UE moves towards the center of the coverage; and/or adjust the width to be narrower if the UE moves towards the edge of the coverage.

17. The non-transitory computer readable medium according to claim 15, wherein the location of the UE in the coverage is characterized by a pilot signal quality of the radio node.

18. The non-transitory computer readable medium according to claim 17, wherein the pilot signal quality of the radio node is indicated by one of:

a reference signal strength of the radio node;

a reference signal Signal to Interference plus Noise Ratio (SINR) of the radio node; and the reference signal strength of the radio node and a reference signal strength of one or more neighboring radio nodes of the radio node.

* * * * *